(12) United States Patent
Xiang et al.

(10) Patent No.: US 8,186,026 B2
(45) Date of Patent: May 29, 2012

(54) TECHNIQUE FOR MAINTAINING SECURE NETWORK CONNECTIONS

(75) Inventors: Jing Xiang, Acton, MA (US); Shreedhar Shirgurkar, Chelmsford, MA (US); Vladimir Senkov, Chelmsford, MA (US); Champak Das, Marlboro, MA (US)

(73) Assignee: Rockstar Bidco, LP, New York, NY (US)

( * ) Notice: Subject to any disclaimer, the term of this patent is extended or adjusted under 35 U.S.C. 154(b) by 2189 days.

(21) Appl. No.: 10/791,414

(22) Filed: Mar. 3, 2004

(65) Prior Publication Data

US 2005/0198691 A1 Sep. 8, 2005

(51) Int. Cl.
G06F 7/04 (2006.01)

(52) U.S. Cl. ................ 26/3; 713/161; 713/168

(58) Field of Classification Search .......... 713/201, 713/151, 161, 202
See application file for complete search history.

(56) References Cited

U.S. PATENT DOCUMENTS

| | | | | |
|---|---|---|---|---|
| 6,108,300 | A * | 8/2000 | Coile et al. ............ | 370/217 |
| 6,173,312 | B1 * | 1/2001 | Atarashi et al. ........ | 709/203 |
| 6,502,135 | B1 * | 12/2002 | Munger et al. ........ | 709/225 |
| 6,823,461 | B2 * | 11/2004 | Lakshmi et al. ....... | 726/13 |
| 6,832,322 | B1 * | 12/2004 | Boden et al. .......... | 726/15 |
| 6,928,479 | B1 * | 8/2005 | Meyer et al. .......... | 709/227 |
| 6,931,529 | B2 * | 8/2005 | Kunzinger ............. | 713/153 |
| 6,938,076 | B2 * | 8/2005 | Meyer et al. .......... | 709/219 |
| 6,966,003 | B1 * | 11/2005 | Joseph et al. ......... | 726/14 |
| 7,020,464 | B2 * | 3/2006 | Bahl et al. ............ | 455/432.1 |
| 7,107,350 | B2 * | 9/2006 | Godwin et al. ........ | 709/230 |
| 2001/0009025 | A1 * | 7/2001 | Ahonen ................ | 713/161 |
| 2001/0020275 | A1 * | 9/2001 | Jari et al. ............. | 713/201 |
| 2001/0042201 | A1 * | 11/2001 | Yamaguchi et al. .... | 713/151 |
| 2002/0163920 | A1 * | 11/2002 | Walker et al. ......... | 370/401 |
| 2003/0182431 | A1 | 9/2003 | Sturniolo et al. | |
| 2004/0117653 | A1 * | 6/2004 | Shapira et al. ........ | 713/201 |

OTHER PUBLICATIONS

S. Kent, R. Atkinson, "Security Architecture for the Internet Protocol," RFC 2401, Nov. 1998.
D. Piper, "The Internet IP Security Domain of Interpretation for ISAKMP," RFC 2407, Nov. 1998.
D. Maughan, M. Schertler, M. Schneider, J. Turner, "Internet Security Association and Key Management Protocol (ISAKMP)," RFC 2408, Nov. 1998.
U.S. Appl. No. 10/862,514, filed Jun. 7, 2004, and entitled "Transitioning a State of a Connection in Response to an Indication that a Wireless Link to a Wireless Device has been Lost," pp. 1-20, Figs. 1-2.

(Continued)

*Primary Examiner* — Kambiz Zand
*Assistant Examiner* — Amare F Tabor
(74) *Attorney, Agent, or Firm* — Withrow & Terranova, PLLC (57) ABSTRACT

A technique for maintaining secure network connections is disclosed. In one particular exemplary embodiment, the technique may be realized as a method for maintaining secure network connections. The method may comprise detecting a change of address associated with a first network element. The method may also comprise updating at least one first security configuration at the first network element. The method may further comprise transmitting at least one secure message from the first network element to a second network element, wherein the at least one secure message comprises information associated with the change of address. And the method may comprise updating at least one second security configuration at the second network element based at least in part on the at least one secure message.

10 Claims, 6 Drawing Sheets

OTHER PUBLICATIONS

J. Case et al., Network Working Group, RFC: 1067; "A Simple Network Management Protocol," pp. 1-31 (Aug. 1988).

R. Droms, Network Working Group, RFC: 2131, "Dynamic Host Configuration Protocol," pp. 1-43 (Mar. 1997).

S. Deering et al., Network Working Group, RFC: 2460, "Internet Protocol, Version 6 (IPv6) Specification," pp. 1-37 (Dec. 1998).

Information Sciences Institute, RFC: 791, "Internet Protocol," pp. 1-49 (Sep. 1981).

Information Sciences Institute, RFC: 793, "Transmission Control Protocol," pp. 1-88 (Sep. 1981).

Byoung-Jo, K., et al., "Simple Mobility Support for IPsec Tunnel Mode," 2003 IEEE 58th Vehicular Technology Conference, Oct. 6-9, 2003, vol. 3, pp. 1999-2003.

Examination Report for European Application No. 05724836.1 issued Mar. 30, 2011, 9 pages.

* cited by examiner

TECHNIQUE FOR MAINTAINING SECURE NETWORK CONNECTIONS

FIELD OF THE INVENTION

The present invention relates generally to telecommunications and, more particularly, to a technique for maintaining secure network connections.

BACKGROUND OF THE INVENTION

IP Security (IPsec) is a security architecture for internet protocol (IP) that includes a set of protocols developed by the Internet Engineering Task Force (IETF) to support secure exchange of packets at the IP layer. IPsec provides security services by enabling a system to select required security protocols, determine the algorithm(s) to use for the service(s), and put in place any cryptographic keys required to provide the requested services. IPsec uses two protocols to provide traffic security: Authentication Header (AH) and Encapsulating Security Payload (ESP). For IPsec to work, the sending and receiving devices typically share a public key which is handled through the Internet Security Association and Key Management Protocol (ISAKMP).

A Security Association (SA) is a security-protocol-specific set of parameters that completely defines the services and mechanisms necessary to protect traffic at that security protocol location. These parameters typically include algorithm identifiers, modes, cryptographic keys, etc. An SA is often referred to by its associated security protocol (for example, "ISAKMP SA", "ESP SA").

At the initiation of a secure connection between two network elements, they must first negotiate an ISAKMP SA to protect their further negotiations. This ISAKMP SA is then used in negotiating Protocol SA's. During the negotiation and establishment of Protocol SA's, a security parameter index (SPI) is generated for each SA. The negotiated SA's are typically stored in a security association database (SAD), and an SPI is used together with a destination IP address and a security protocol to uniquely identify an SA. Another database typically maintained by an IPsec-enabled element is a security policy database (SPD) which specifies the policies concerning disposition of all IP packets. Each IPsec-enabled interface typically maintains separate inbound and outbound databases (SPD and SAD).

In a wireless local area network (WLAN), which has become more and more popular, it is not uncommon for a mobile user to roam among different subnets or from one geographic area to another using different IP addresses. It has become increasingly desirable to support the ability of maintaining secure connections without loss of data while a mobile client experiences a change of IP address. However, current IPsec architecture does not support such an IP address change without terminating the old connection and re-establishing a new one. As a result, a roaming client would encounter inevitable network service disruptions, which is not only inconvenient for the client but also burdensome for the network due to overhead costs from repeated security negotiations.

Figure 1:
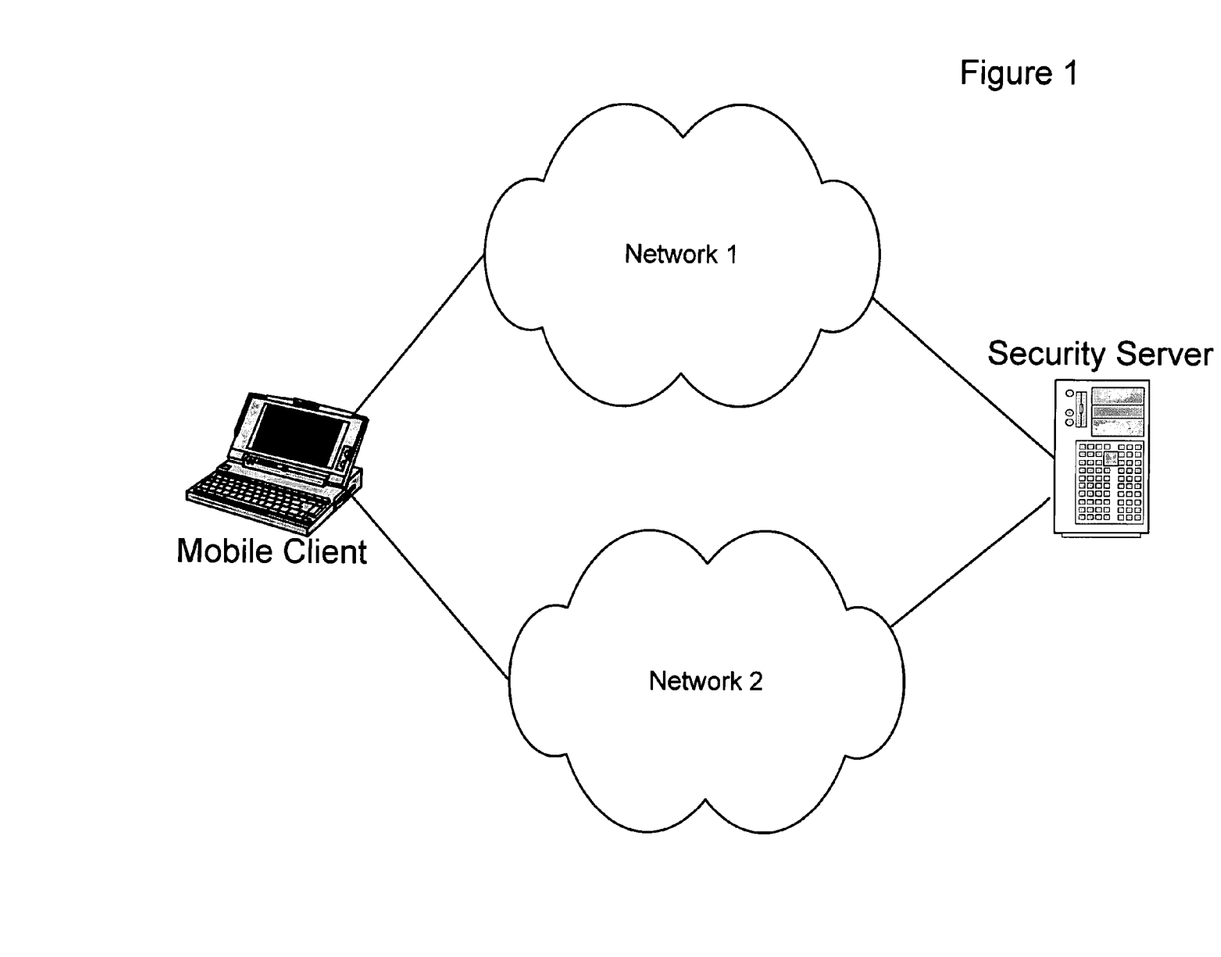
FIG. 1 is a schematic illustration of a Mobile IP solution adopted in prior arts.

One solution to the loss-of-connection problem is to adopt Mobile IP in an IPsec implementation. With this solution, a mobile client is assigned a relatively permanent Mobile IP address in its home network. When roaming into a foreign network, the client obtains a care-of IP address from a foreign agent and communicates with the rest of the world through the foreign agent. As shown in FIG. 1, when it roams from Network 1 to Network 2, the mobile client has to maintain double tunneling to the Security Server in order not to lose connection. Mobile IP with double tunneling is highly inefficient and can be especially problematic for a resource-limited mobile unit. In addition, it takes considerable development effort to implement Mobile IP.

In view of the foregoing, it would be desirable to provide a mobility solution which overcomes the above-described inadequacies and shortcomings.

SUMMARY OF THE INVENTION

According to the present invention, a technique for maintaining secure network connections is provided. In one particular exemplary embodiment, the technique may be realized as a method for maintaining secure network connections. The method may comprise detecting a change of address associated with a first network element. The method may also comprise updating at least one first security configuration at the first network element. The method may further comprise transmitting at least one secure message from the first network element to a second network element, wherein the at least one secure message comprises information associated with the change of address. And the method may comprise updating at least one second security configuration at the second network element based at least in part on the at least one secure message.

In accordance with other aspects of this particular exemplary embodiment of the present invention, a lookup of security associations may be not dependent on any destination address.

In accordance with further aspects of this particular exemplary embodiment of the present invention, the first network element may be a mobile client and the second network element may be a security gateway.

In accordance with still further aspects of this particular exemplary embodiment of the present invention, the first network element and the second network element may be part of a virtual private network (VPN).

In accordance with additional aspect of this particular exemplary embodiment of the present invention, communications between the first network element and the second network element may be based on a security architecture for the internet protocol (IPsec). At least part of the communications between the first network element and the second network element may be based on an internet security association and key management protocol (ISAKMP). The second network element may identify at least one security association based on at least one cookie field in the at least one secure message.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited above.

In still another particular exemplary embodiment, the technique may be realized as a method for maintaining secure network connections. The method may comprise duplicating, between a second network element and a third network element, information associated with a secure network connection between a first network element and the second network element, wherein a lookup of security associations associated with the secure network connection is not dependent on any destination address. The method may also comprise replacing the second network element with the third network element in the secure network connection with the first network element. The method may further comprise sending at least one secure message from the third network element to the first network element.

In a further particular exemplary embodiment, the technique may be realized as a method for maintaining secure network connections. The method may comprise configuring a plurality of security gateways such that a lookup of security associations is not dependent on any destination address. The method may further comprise sharing at least one security association among the plurality of security gateways.

In a still further particular exemplary embodiment, the technique may be realized by a system for maintaining secure network connections. The system may comprise means for detecting a change of address associated with a first network element, means for updating at least one first security configuration at the first network element, means for transmitting at least one secure message from the first network element to a second network element, wherein the at least one secure message comprises information associated with the change of address, and means for updating at least one second security configuration at the second network element based on the at least one secure message.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

For illustration purposes, the technique for maintaining secure network connections in accordance with the present invention will be described below with specific reference to IPsec in tunnel mode. However, it should be appreciated that the technique is applicable to any secure network protocols regardless of the mode of operation. As used hereinafter, a "security gateway" refers to any intermediate or terminal system, such as a router, a firewall or a server, that implements IPsec protocols. A "mobile client" refers to a remote user or unit that communicates with a security gateway using IPsec protocols. One or more security gateways and mobile clients may form a security network system.

Figure 2:
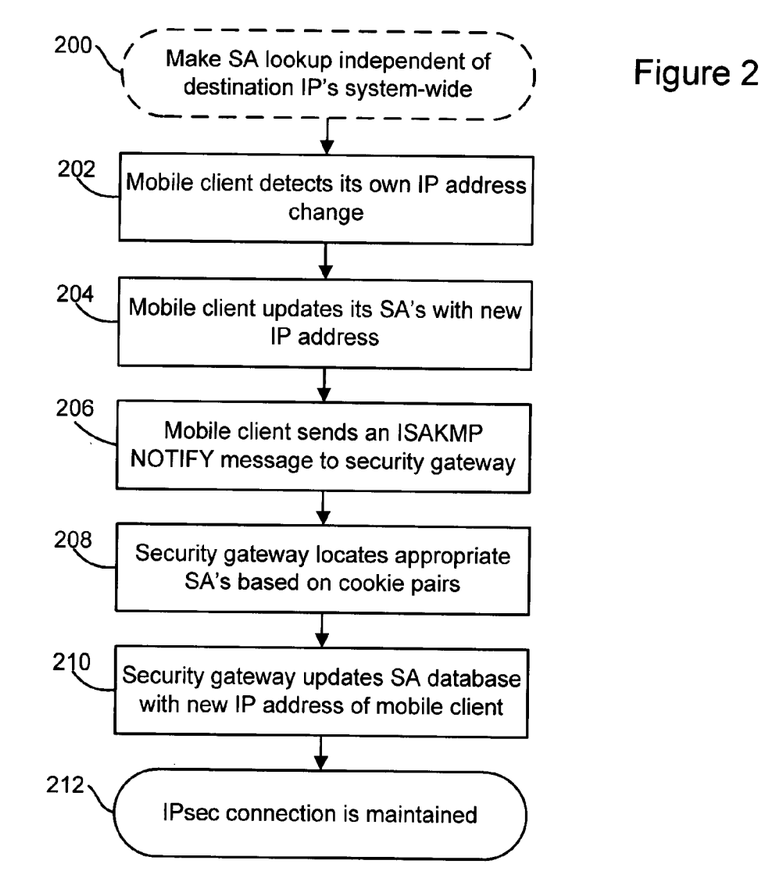
FIG. 2 is a flow chart illustrating an exemplary method for maintaining secure network connections in accordance with an embodiment of the present invention.

Referring to FIG. 2, there is shown a flow chart illustrating an exemplary method for maintaining secure network connections in accordance with an embodiment of the present invention.

In step 200, Security Association (SA) lookup may be made independent of destination IP address system-wide.

Figure 3:
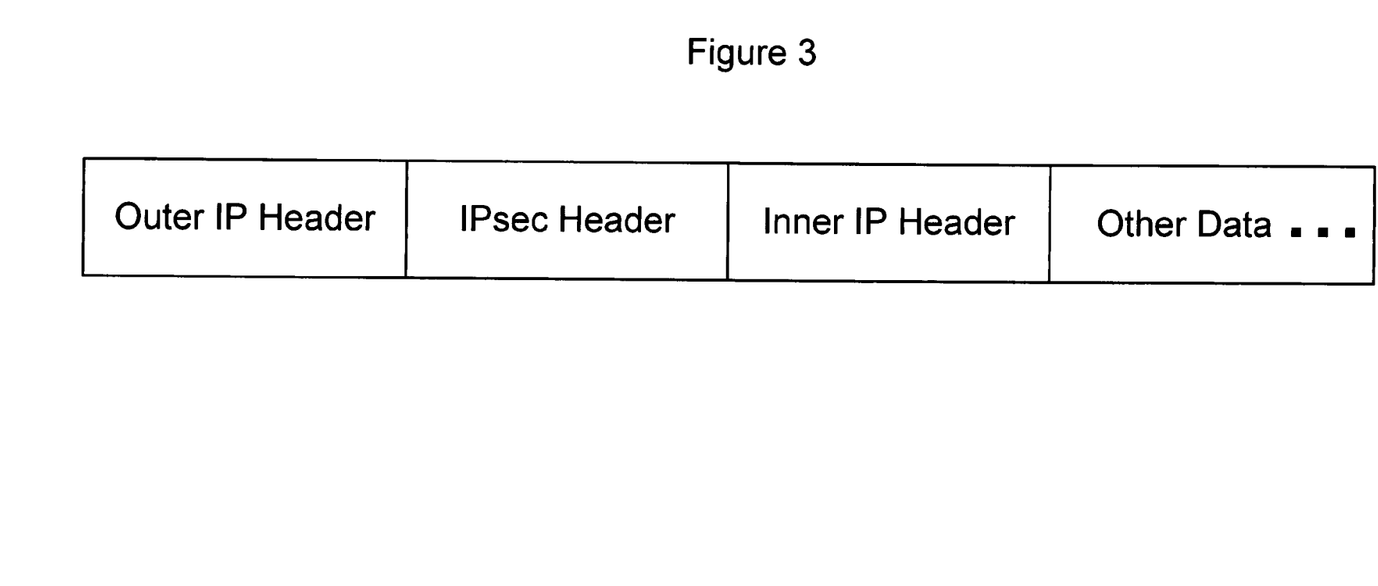
FIG. 3 is an illustration of an exemplary IPsec packet in accordance with an embodiment of the present invention.

In the context of IPsec in tunnel mode, an IPsec-processed packet typically has a format as illustrated in FIG. 3. The packet contains an Outer IP Header, an IPsec Header, an Inner IP Header and Other Data. The Inner IP Header, which contains the original source and destination addresses, and Other Data (e.g., payloads) are protected with encryption. The information associated with the encryption and authentication is contained in the IPsec Header. And the Outer IP Header contains source and destination addresses for the tunnel endpoints. For inbound processing, a security gateway will use the destination IP address in the Outer IP Header, together with the Security Parameter Index (SPI) and the type of protocol as indicated in the IPsec Header, to look up the appropriate SA(s) in a local SA Database (SAD). The appropriate SA or SA bundles are then used in authenticating and decrypting the packet.

When SA lookup is made independent of destination IP address, SPI may be used to uniquely identify an SA within a protocol. This system-wide change may offer a number of advantages. For example, since inbound processing is no longer dependent on destination IP address, the change of outer IP address would not affect a security gateway's ability to locate the correct SA(s). Further, with the removal of dependency on destination IP address, the same SA may be shared among multiple IPsec tunnels and multiple nodes in a group. The resulting High Availability and Group Mode Security will be described in more detail below.

In step 202, a mobile client may detect its own IP address change. As a mobile client moves into a different network or geographic area, its IP address may change to a different value. The change of address may also result from a switch of network adapters, e.g., from a WLAN to a LAN card or vice versa. As the mobile client detects the change, it may keep a record of the new address as well as the old address.

In step 204, the mobile client may update its own ISAKMP SAs and IPsec SAs with the new IP address.

Next, in step 206, the mobile client may use a current ISAKMP SA to send a NOTIFY message to a security gateway with whom the client has been maintaining a secure connection. The NOTIFY message may contain at least the client's old IP address and new IP address. The NOTIFY message may also include a sequence number to ensure reliable delivery and detection of duplicate packets. The contents of the NOTIFY message are securely protected by the ISAKMP SA encryption. The ISAKMP NOTIFY message may be subject to the same retry and timeout of other ISAKMP messages.

In step 208, upon receiving the NOTIFY message, the security gateway may locate the appropriate ISAKMP SA based on the cookie fields in the ISAKMP header. The cookie fields uniquely identify the SA associated with the NOTIFY message. The appropriate SA may then be applied to process the secure NOTIFY message to extract the old and new IP addresses.

In step 210, the security gateway may then update its SADs based on the old and new IP addresses of the mobile client. According to embodiments of the invention, it may be more desirable to update the security gateway's SADs based on a secure NOTIFY message from the mobile client rather than based on inbound data with the new IP address. To update the outbound SAD or ISAKMP SAs using an outer IP header may expose the security gateway to denial of service (DoS) attacks since the outer IP header is not protected by integrity check such as Hashed Message Authentication Code (HMAC). Further, the security gateway might need to forward data to the client before any inbound data is received.

In step 212, after the security gateway is updated with the new IP address of the mobile client, the IPsec connection may be maintained. IP traffic can continue flowing in both directions between them without disruption. Once the mobile client receives data packets destined to the new IP address, it will know that the update of new IP address has succeeded.

Figure 4:
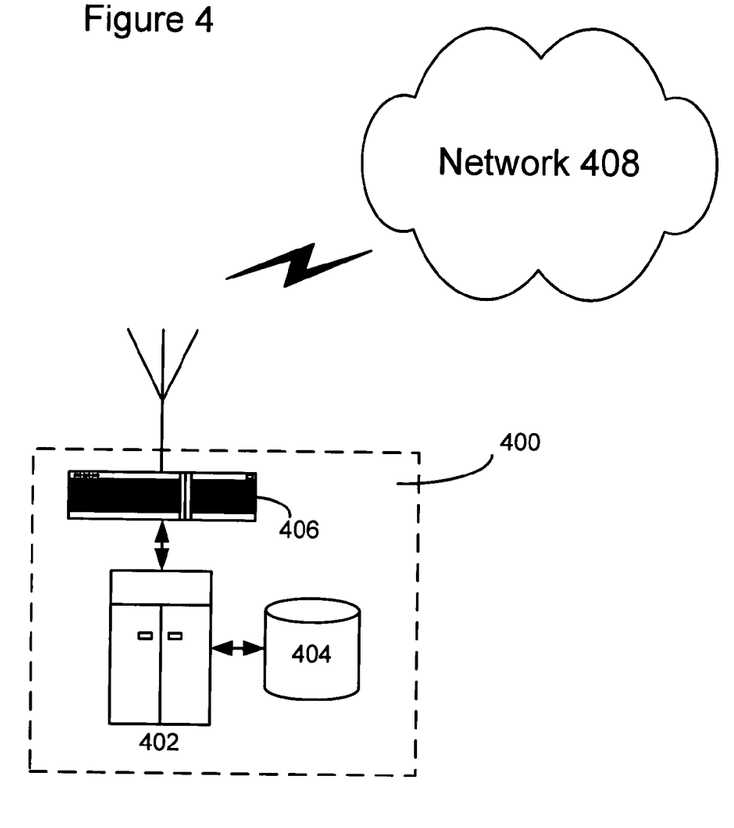
FIG. 4 is a block diagram illustrating an exemplary system for maintaining secure network connections in accordance with an embodiment of the present invention.

Referring now to FIG. 4, there is shown a block diagram illustrating an exemplary system (400) for maintaining secure network connections in accordance with an embodiment of the present invention. The System 400 may be any network element (e.g., a remote unit, router or server) that implements IPsec protocols. The System 400, typically comprises a processor module 402, a storage module 404 and a transceiver module 406. The processor module 402 may be a central processing unit (CPU), micro-controller, digital signal processing (DSP) unit, or computer with packet-processing and hardware-control functions. The storage module 404 may be a storage device, such as a semiconductor memory, nonvolatile memory, hard drive disk, CD-ROM or similar, that is accessible by the processor module 402. Storage module 404 may hold data records including SADs, SPDs, and IP addresses, etc. The transceiver module 406 may be capable of transmitting and receiving data packets. In operation, the processor module 402 may follow the IPsec protocols including ISAKMP in accordance with the exemplary method described above. System 400 depicts the typical components of either a mobile client or a security gateway. As a mobile client, the processor module 402 may detect its IP address change, store the old and new addresses in the storage module 404, update the local SADs with the new address, and send an ISAKMP NOTIFY message, via the transceiver module 406, to a security gateway. As a security gateway, the processor module 402 may receive the ISAKMP NOTIFY message via the transceiver module 406, look up the ISAKMP SA in the storage module 404 based on the cookie pairs in the NOTIFY message, decrypt the message with the ISAKMP SA, and update the local SADs based on the old and new IP addresses.

As mentioned above, removal of dependency on destination IP address makes it possible to achieve High Availability and Group Mode Security. These two implementations are described in connection with FIGS. 5 and 6.

Figure 5:
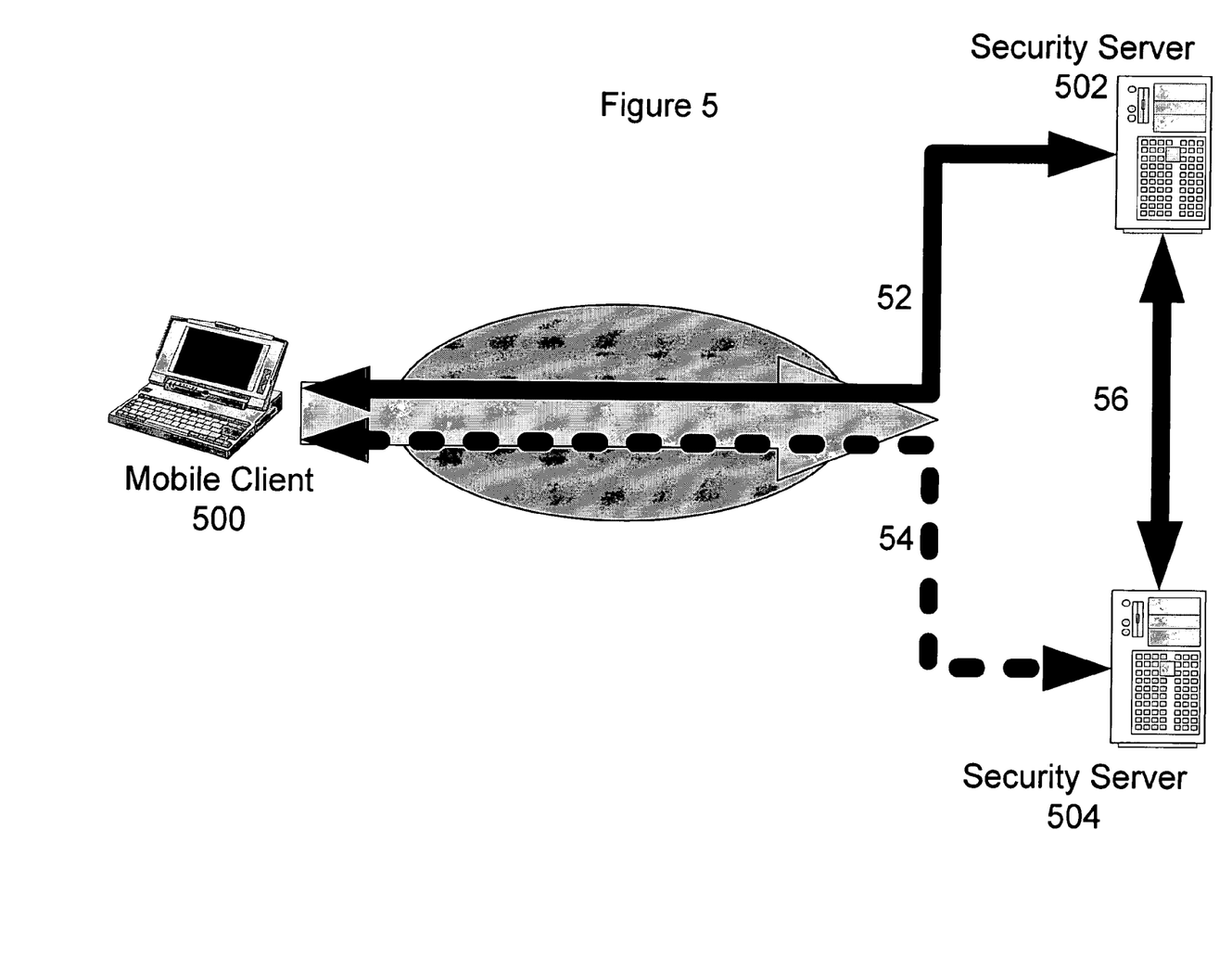
FIG. 5 is a block diagram illustrating an exemplary implementation of High Availability in accordance with an embodiment of the present invention.

FIG. 5 is a block diagram illustrating an exemplary implementation of High Availability in accordance with an embodiment of the present invention. In FIG. 5, there is shown a Mobile Client 500 maintaining a secure connection with a Security Server 502 via an IPsec Tunnel 52. When the IPsec connection is established between Mobile Client 500 and Security Server 502, a copy of the IPsec SAs and the ISAKMP SAs may be sent via a secure path 56 to a Security Server 504. During the life of the connection between Client 500 and Server 502, any changes in their security configurations may be securely duplicated to Server 504. In the same time, Server 504 may constantly monitor the operations of Server 502. When Server 502 fails, Server 504 may send an ISAKMP NOTIFY message to Client 500 indicating the connection will be taken over by Server 504. Since Server 504 is up-to-date with all the security information concerning the connection between Client 500 and Server 502, Client 500 will be able to decrypt the NOTIFY message and start forwarding traffic to Server 504 without re-establishing an IPsec connection. And since there is no SA dependency on destination IP address, Server 504 should be able to communicate with Client 500 via IPsec Tunnel 54 in exactly the same way as Server 502 did. As a result, Client 500 may experience minimal impact due to failure of Server 502.

Figure 6:
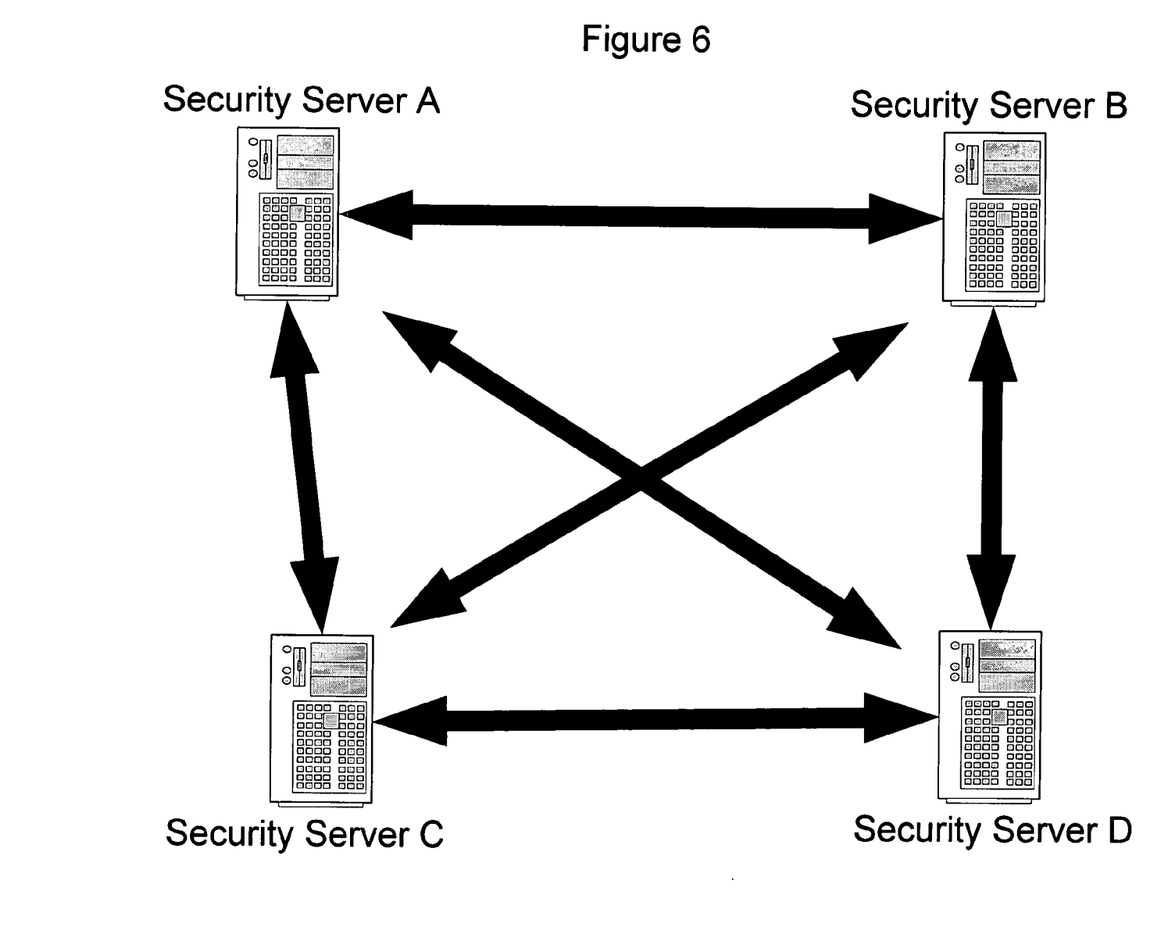
FIG. 6 is a block diagram illustrating an exemplary implementation of Group Mode Security in accordance with an embodiment of the present invention.

FIG. 6 is a block diagram illustrating an exemplary implementation of Group Mode Security in accordance with an embodiment of the present invention. Current IPsec is a point-to-point model. With the SA dependency on destination IP addresses, each connection between any two nodes has to be individually configured. For a system with N nodes, N being an integer, a total of $N*(N-1)/2$ connections must be configured. As the number of nodes increases, the number of connections that have to be individually configured may increase very quickly. For example, for an organization with four branch offices, as shown in FIG. 6, a total of six connections among the four security servers (A through D) must be configured. For a system with 8 nodes, 28 connections are to be configured. However, with the removal of dependency on destination IP address, the same SA may be shared among multiple nodes in a group. Any traffic sent among the group nodes may be protected using the same SA. This may make configurations of a large number of branch offices much easier.

Functionalities in accordance with the above-described exemplary method may be achieved without physical modification to existing network hardware. Instead, the mobility solution in accordance with the present invention may be implemented through software and/or firmware upgrades.

At this point it should be noted that the technique for maintaining secure network connections in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with the mobility solution in accordance with the present invention as described above. Alternatively, one or more processors operating in accordance with stored instructions may implement the functions associated with maintaining secure network connections in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

The invention claimed is:

1. A method for maintaining secure network connections, the method comprising:
    duplicating, at a third network element, a security association associated with a secure network connection between a first network element and a second network element, wherein a lookup of the security association associated with the secure network connection is not dependent on any destination address; and
    in response to detecting failure of the second network element, replacing the second network element with the third network element in the secure network connection with the first network element, wherein the secure network connection between the first network element and the third network element is based on the duplicated security association; and
    sending at least one secure message from the third network element to the first network element to notify the first network element that the secure network connection will be taken over by the third network element, the third network element communicating with the first network element without the third network element reestablishing another connection with the first network element.

2. A method for maintaining secure network connections, the method comprising:
    configuring a plurality of security gateways such that a lookup of security associations is not dependent on any destination address;
    sharing a security association among the plurality of security gateways;
    a first of the security gateways detecting failure of a second of the security gateways involved in a secure network connection with a network device, wherein the secure network connection is associated with the security association; and
    in response to detecting the failure, the first security gateway sending a message to the network device that the first security gateway is taking over the secure network connection, the first security gateway communicating with the network device without the first security gateway reestablishing another secure connection with the network device.

3. A first security server comprising:
    a transceiver to receive information relating to at least one security association of a secure network connection between a mobile client and a second security server; and
    a processor module to:
        monitor operation of the second security server;
        in response to detecting failure of the second security server, send a message to the mobile client that the first security server is taking over the secure network connection; and
        communicate with the mobile client using the at least one security association over the secure network connection between the first security server and the mobile client without reestablishing a new connection with the mobile client.

4. The first security server according to claim 3, wherein communications between the mobile client and the first security server are based on a security architecture for the internet protocol (IPsec).

5. The method of claim 1, further comprising:
    during life of the secure network connection between the first and second network elements, the third network element receiving information relating to the security association of the secure network connection from the second network element.

6. The method of claim 5, wherein the first network element is a mobile client, and the second and third network elements are security servers.

7. The first security server according to claim 3, wherein a lookup of security associations is not dependent on any destination address.

8. The method of claim 1, wherein the first network element is a mobile client, and the second and third network elements are security servers.

9. The first security server of claim 3, wherein information relating to the at least one security association is duplicated at the first and second security servers.

10. The method of claim 2, wherein sharing the security association comprises sharing an IPsec security association among the plurality of security gateways.

* * * * *